(12) United States Patent
Matsuo

(10) Patent No.: US 11,861,250 B2
(45) Date of Patent: Jan. 2, 2024

(54) INDUSTRIAL PRINTING SYSTEM, SERVER, AND VARIABLE PRINTING METHOD THAT REDUCE DELAYS DUE TO PROOFREADING DELAYS IN VARIABLE PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/827,631

(22) Filed: May 27, 2022

(65) Prior Publication Data

US 2023/0384999 A1 Nov. 30, 2023

(51) Int. Cl.
*G06F 3/12* (2006.01)

(52) U.S. Cl.
CPC .......... *G06F 3/1243* (2013.01); *G06F 3/1203* (2013.01); *G06F 3/125* (2013.01); *G06F 3/1263* (2013.01); *G06F 3/1264* (2013.01); *G06F 3/1265* (2013.01)

(58) Field of Classification Search
CPC ...... G06F 3/1243; G06F 3/1203; G06F 3/125; G06F 3/1263; G06F 3/1264; G06F 3/1265
See application file for complete search history.

(56) References Cited

U.S. PATENT DOCUMENTS

| | | | | |
|---|---|---|---|---|
| 2011/0128584 | A1* | 6/2011 | Kuroshima | G06F 3/127 358/1.15 |
| 2011/0157637 | A1* | 6/2011 | Kimura | G06K 15/1849 358/1.15 |
| 2011/0267651 | A1* | 11/2011 | Chiba | G06F 3/1205 358/1.15 |
| 2012/0081746 | A1* | 4/2012 | Yamaguchi | G06F 3/121 358/1.15 |
| 2012/0162707 | A1* | 6/2012 | Takenaka | G06K 15/1857 358/1.15 |
| 2018/0157446 | A1* | 6/2018 | Fukuda | G06K 15/16 |

FOREIGN PATENT DOCUMENTS

JP 2010-277217 A 12/2010

* cited by examiner

*Primary Examiner* — John R Wallace
(74) *Attorney, Agent, or Firm* — Hawaii Patent Services; Nathaniel K. Fedde; Kenton N. Fedde

(57) ABSTRACT

Provided is an industrial printing system that reduces the risk of delay due to proofreading in variable printing. This industrial printing system processes variable data for production printing. The status management unit manages the completion status of a plurality of records or a plurality of pages for the variable printing. A process control unit collectively acquires completed record(s) or completed page(s) managed by the status management unit and creates a job ticket. A process management unit performs a prepress process or a printing process by using a job ticket created by the process control unit. A post-processing unit performs post-processing according to the job ticket for a record or a page that has been performed prepress process or printing process by the process management unit.

15 Claims, 7 Drawing Sheets

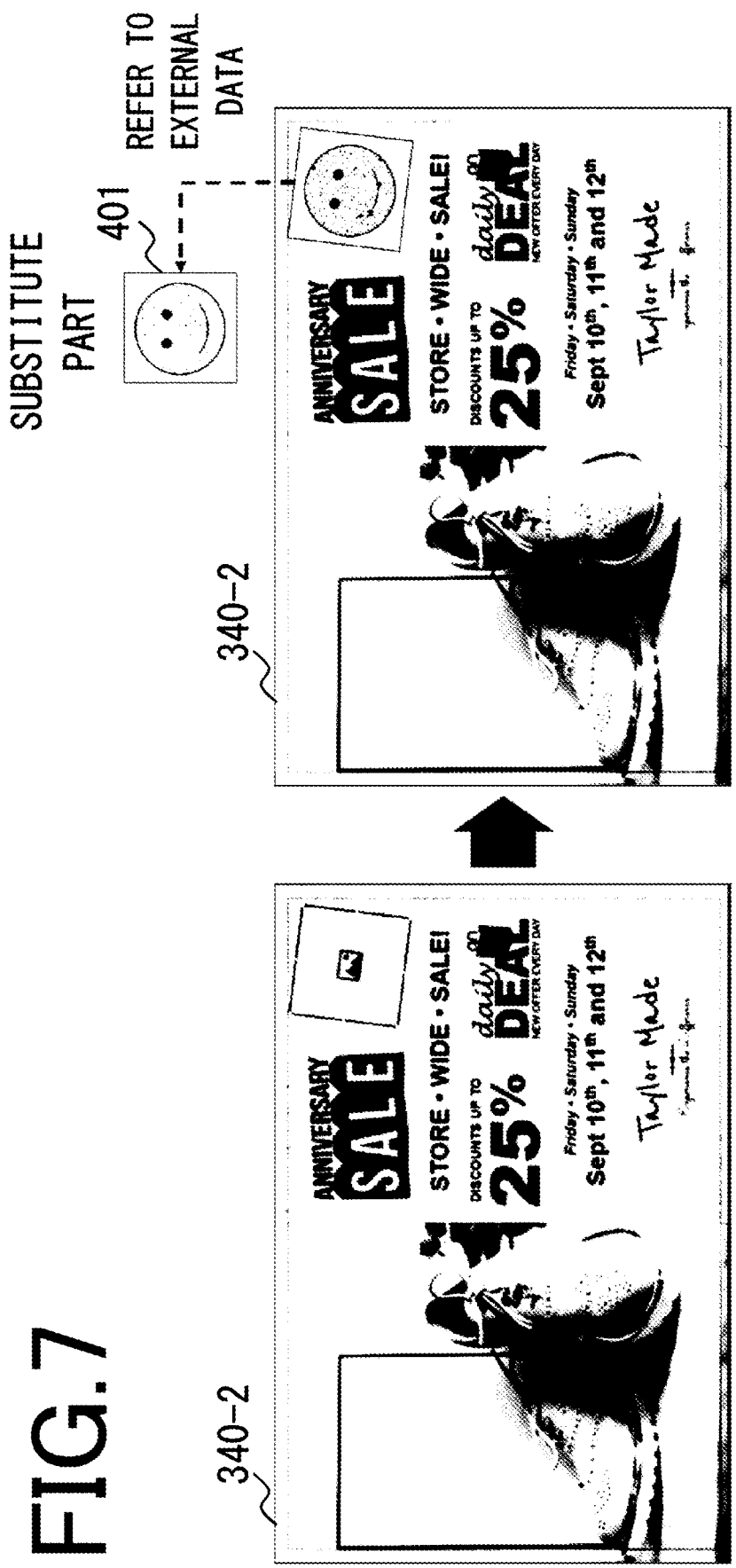

INDUSTRIAL PRINTING SYSTEM, SERVER, AND VARIABLE PRINTING METHOD THAT REDUCE DELAYS DUE TO PROOFREADING DELAYS IN VARIABLE PRINTING

BACKGROUND

The present disclosure specifically relates to an industrial printing system, a server, and a variable printing method for performing variable printing.

Industrial printing, which is called production printing, uses commercial (industrial) printing equipment, and the components of the final product are produced by dividing the work into multiple processes. For example, in the case of bookbinding, the cover, the body (color), the body (black and white), the promotional material, the band, the shipping envelope, and the like, are processed as different jobs, respectively. Then, in the middle of the process, each job is combined and finished a book as a final product.

On the other hand, there is a variable printing technology that prints differently for each record in the database by using a common form, or the like.

As a typical variable printing technology, a print control program and a variable printing system that can easily set an output form for each record on the apparatus side that instructs variable printing are described. In this technology, image layout information that associates each record with an image to be printed is generated based on a database in which a plurality of records is described. In addition, the apparatus information, which the print setting conditions of the apparatus that executes variable printing are described, is acquired. Then, based on the information set by using the database and the apparatus information, the print setting information that associates each record with the print setting condition is generated. It also outputs image layout information and print setting information.

SUMMARY

An industrial printing system of the present disclosure is an industrial printing system that performs variable printing by production printing, including: a status management unit that manages completion status of a plurality of records or a plurality of pages for the variable printing; a process control unit that collectively acquires a completed record or a completed page managed by the status management unit and creates a job ticket; and a process management unit that performs prepress process or printing process by using the job ticket created by the process control unit.

A server of the present disclosure is a server of an industrial printing system that performs variable printing by production printing, including: a status management unit that manages completion status of a plurality of records or a plurality of pages for the variable printing; a process control unit collectively acquires a completed record or a completed page managed by the status management unit and creates a job ticket; a process management unit that performs prepress process or printing process by using the job ticket created by the process control unit; and a post-processing unit that performs post-processing according to the job ticket for a record or a page that has been performed prepress process or printing process by the process management unit.

A variable printing method of the present disclosure is variable printing method executed by a server of an industrial printing system that performs variable printing by production printing, including the steps of: managing completion status of a plurality of records or a plurality of pages for the variable printing; acquiring a completed record or a completed page, collectively, and creating a job ticket; and performing prepress process or printing process by using the job ticket that is created.

BRIEF DESCRIPTION OF THE DRAWINGS

FIG. 7 is a conceptual diagram of linking substitute part in the variable data process as shown in FIG. 4.

DETAILED DESCRIPTION

Embodiment

[Configuration of Industrial Printing System X]

Figure 1:
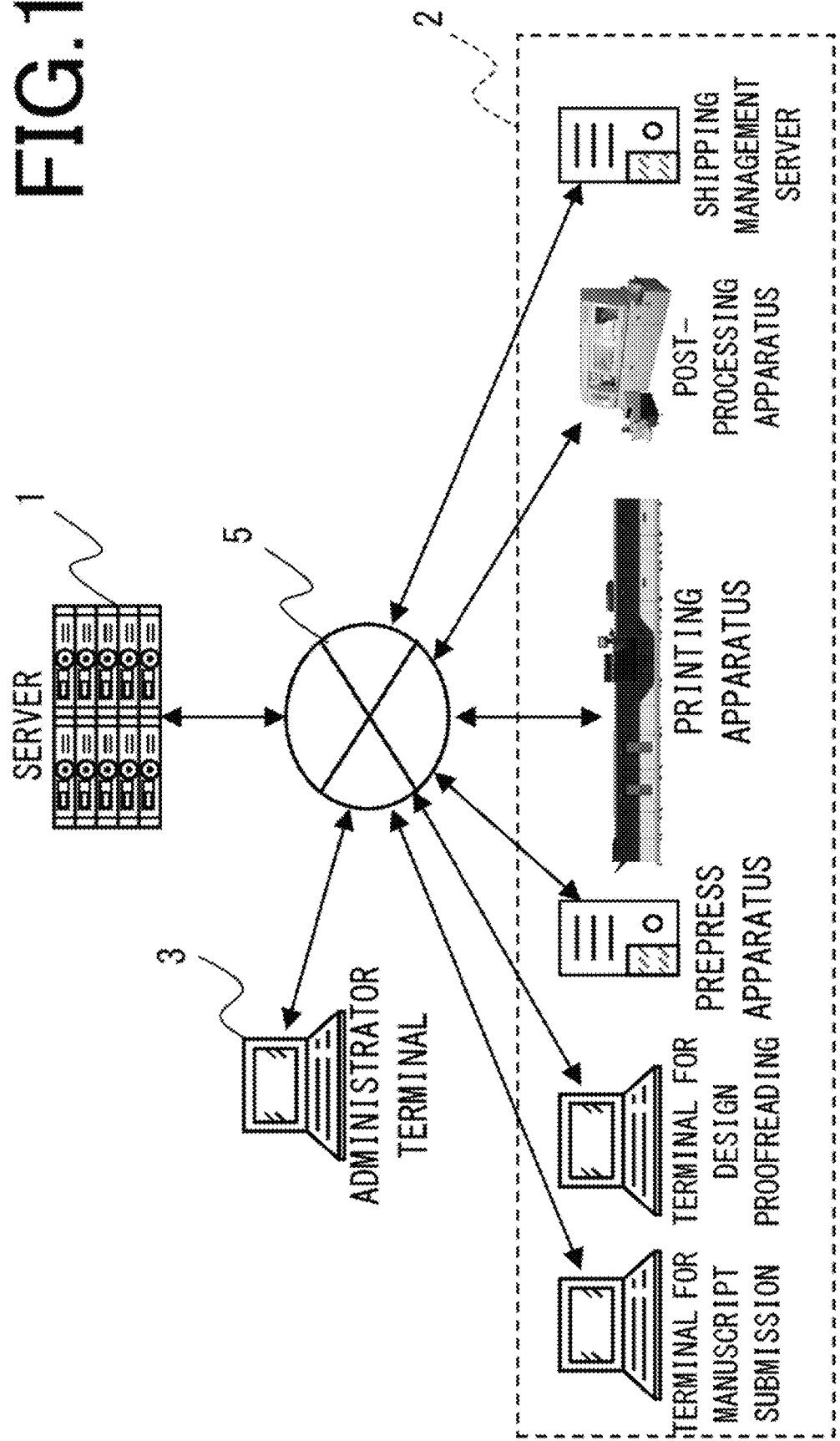
FIG. 1 is a system configuration diagram of an industrial printing system according to an embodiment of the present disclosure.

Firstly, with reference to FIG. 1, the overall system configuration of the industrial printing system X according to the present embodiment is described.

The industrial printing system X according to the present embodiment is a system that executes design and printing in industrial printing (production printing).

Here, in the industrial printing system X according to the present embodiment, the final product such as an output book is set as an "order", and each component of the order is set as a job. In the industrial printing system X according to the present embodiment, each job for outputting the order is assigned to a component apparatus 2 and managed by the workflow.

The industrial printing system X according to the present embodiment includes a server 1, the component apparatus 2, and an administrator terminal 3, and each apparatus is connected by a network 5.

The server 1 is a server for designing variable printing in industrial printing, managing a workflow, and executing process management. The server 1 is a PC (Personal Computer) server, a dedicated machine, a general-purpose machine, or the like, settled on a so-called cloud or at a user's place.

On this basis, the server 1 designs a variable document by a dedicated design application software (hereinafter, simply referred to as "application"). Further, the server 1 manages each process of the industrial printing workflow by executing the printing process management application.

Specifically, the server 1 sends and receives various instructions and information to and from the component apparatus 2 for each process in printing, and it manages the status and requests processing for each component apparatus 2. In addition, the server 1 may be a server that executes a common platform that performs user management, tenant management, security management, notification service for maintenance, prepress management, storage management of each document, management of printing apparatuses, and the like. The above application may run on this server.

The component apparatus 2 is a component that executes various jobs of production printing, and is each apparatus managed by the server 1. The component apparatus 2 includes, for example, a terminal for submission, a terminal for design proofreading, a prepress apparatus, a printing apparatus for production printing, a post-processing apparatus, a shipping management server, and the like. In this embodiment, one of these apparatuses is simply referred to as a component apparatus 2. Of the component apparatuses 2, each terminal or server can be connected to the server 1 via a web browser such as a PC or smartphone, a dedicated application, or the like.

The administrator terminal 3 is a terminal used by a printing process administrator, or the like, among users. The administrator terminal allows the user to access the server 1 to design a variable document by GUI, check the progress status, and request processing.

Figure 2:
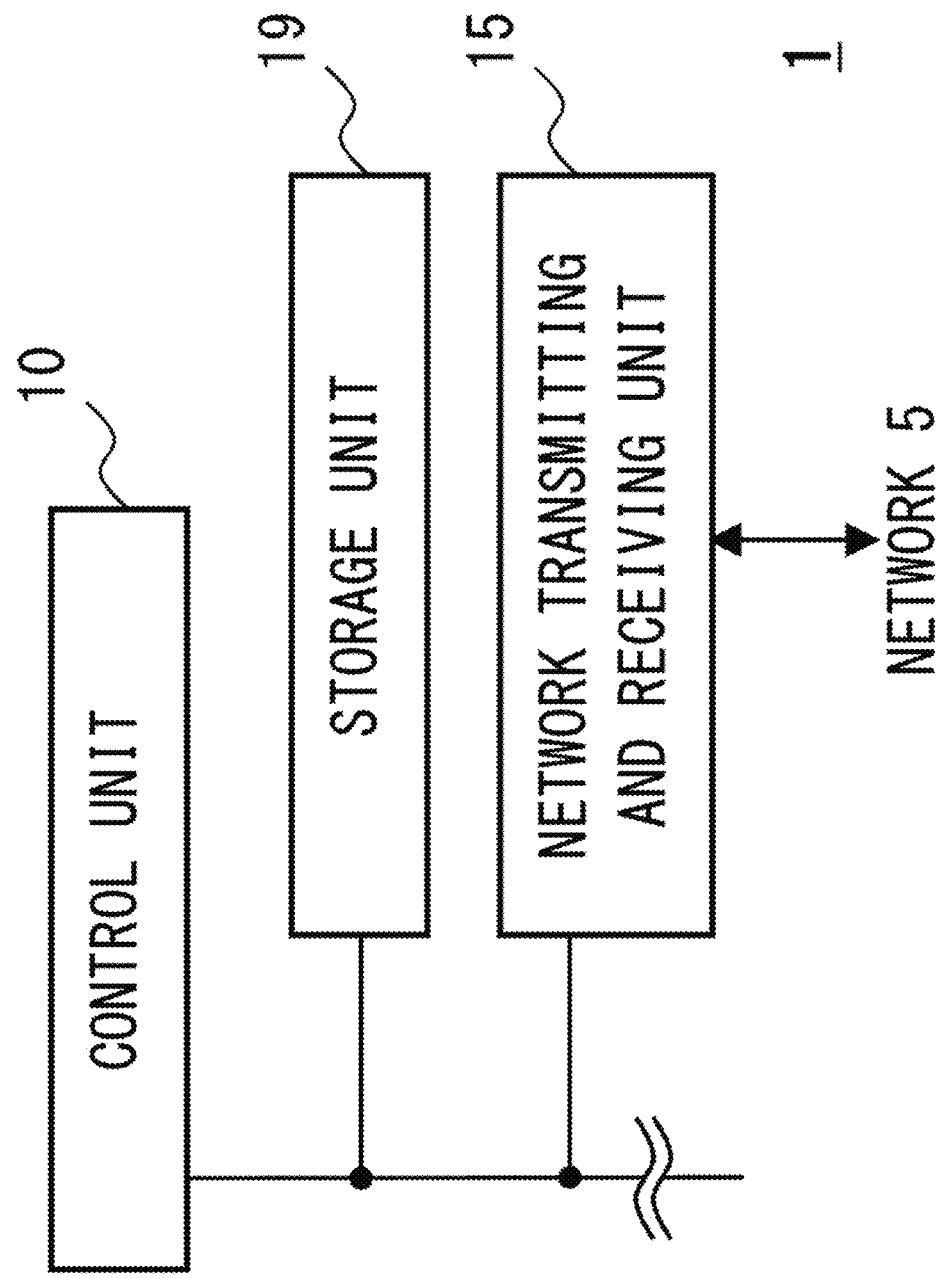
FIG. 2 is a block diagram showing the control configuration of the server as shown in FIG. 1.

Next, with reference to FIG. 2, the control configuration of the server 1 is described.

The server 1 includes a control unit 10, a network transmitting and receiving unit 15, a storage unit 19, and the like. Each unit is connected to the control unit 10 and its operation is controlled by the control unit 10.

The control unit 10 is an information processing unit that includes a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for a specific application), or the like.

The control unit 10 reads out the control program stored in the ROM or HDD of the storage unit 19, expands the control program in the RAM, and executes the control program, so that the control unit 10 can be operated as each part of the functional block as described later. Further, the control unit 10 controls the entire apparatus according to the instruction information input from the administrator terminal 3 or the console.

The network transmitting and receiving unit 15 is a network connection unit including a LAN board, a wireless transceiver, and the like, for connecting to the network 5. The network 5 according to the present embodiment is, for example, a LAN (Local Area Network), Wi-Fi, WAN (Wide Area Network), a mobile phone network, a voice telephone network, or the like. The network transmitting and receiving unit 15 transmits/receives data on a data communication line, and it transmits/receives a voice signal on a voice telephone line.

storage unit 19 is a non-transitory recording medium such as a semiconductor memory, which is a ROM (Read Only Memory), a RAM (Random Access Memory), or the like, an HDD (Hard Disk Drive), or the like.

A control program for controlling the operation of the server 1 is stored in the ROM or HDD of the storage unit 19. The control program includes an OS (Operating System), middleware on the OS, services (daemons), various applications, database data, and the like. Among these, various applications include the above-mentioned printing process management application.

[Functional Configuration of Server 1]

Figure 3:
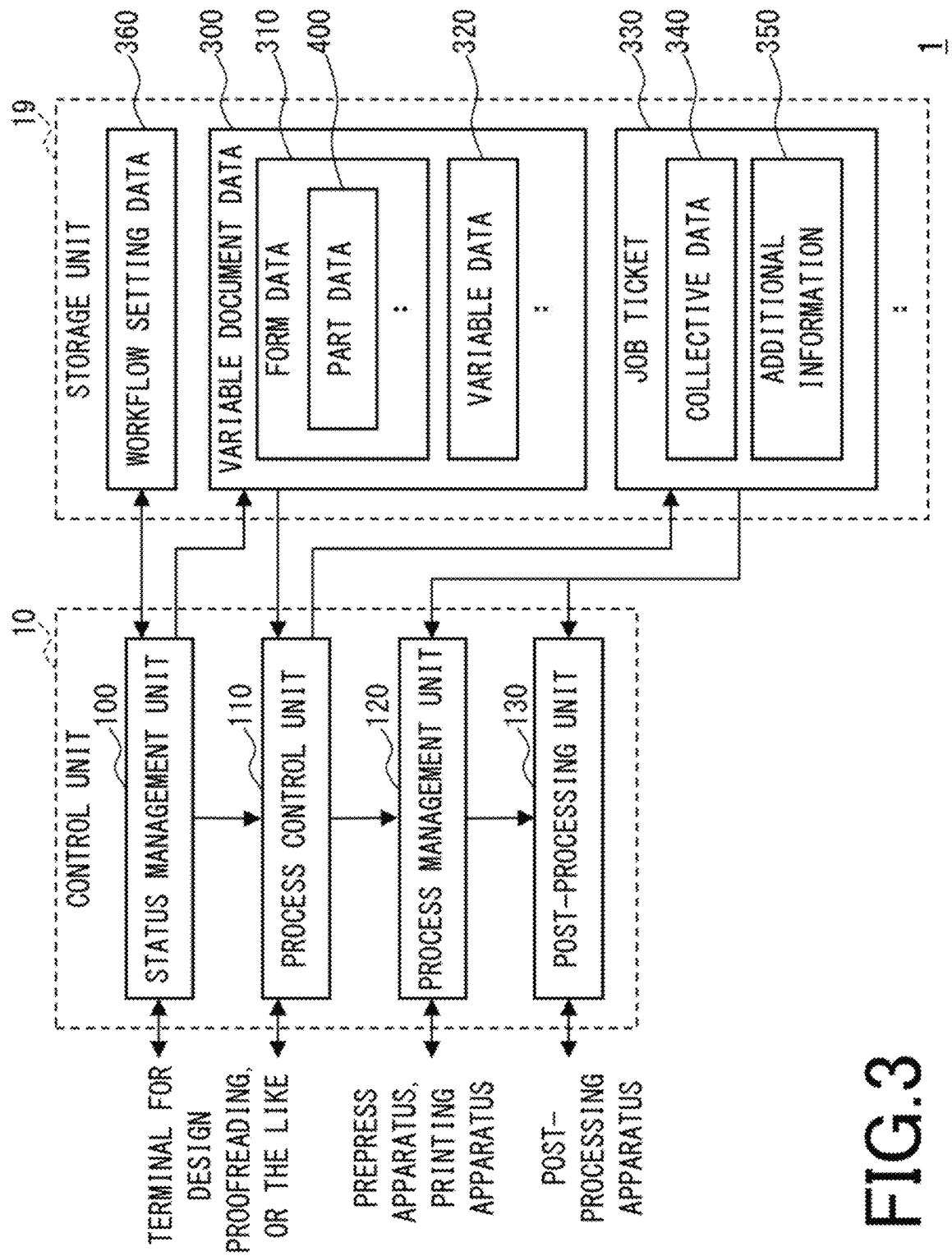
FIG. 3 is a block diagram showing a functional configuration of an industrial printing system according to an embodiment of the present disclosure.

Here, with reference to FIG. 3, the functional configuration of the server 1 is described.

The control unit 10 of the server 1 includes a status management unit 100, a process control unit 110, a process management unit 120, and a post-processing unit 130.

The storage unit 19 stores the variable document data 300, the job ticket 330, and the workflow setting data 360.

The status management unit 100 manages the design of the variable document data 300 according to the workflow setting data 360.

Specifically, the status management unit 100 manages the completion status of a plurality of records or a plurality of pages for variable printing. At this time, the status management unit 100 also manages the completion status of the part data 400 in which a "part" forming the page is stored.

The process control unit 110 collectively acquires the completed records or completed pages managed by the status management unit 100, and it creates the job ticket 330.

The process control unit 110 is able to set the job ticket 330 to a record priority mode or a page priority mode for the output of the variable document data 300.

Here, in the present embodiment, the record priority mode is a mode in which the collected records are advanced to the next step and output first. The page priority mode is a mode in which the collected pages are advanced to the next process and output first.

In the record priority mode, the process control unit 110 records the record order of the completed records in the plurality of records to the job ticket 330.

On the other hand, in the page priority mode, the process control unit 110 acquires a page in which all of the plurality of parts has been completed as completed. At this time, the process control unit 110 creates the job ticket 330 by using the substitute part 401 for an uncompleted part. Then, the process control unit 110 saves the substitute part 401 as the data of linking (hereinafter, "link data") that refers to the external data. The external data may be a file stored in the storage unit 19, a file stored in an external terminal, a server, or the like.

The process control unit 110 creates the job ticket 330, which prepress, printing, post-processing, and an output destination are specified, according to the modes.

The process management unit 120 performs processing according to the job ticket 330.

In the present embodiment, the process management unit 120 performs a prepress process or a print process by using the job ticket 330 created by the process control unit 110.

Here, in the record priority mode, the process management unit 120 uses the information of the record order recorded in the job ticket 330 in the prepress process.

On the other hand, in the page priority mode, the process management unit 120 records the page order of the completed pages in the job ticket 330. In addition, the process management unit 120 uses information of the page order recorded in the job ticket 330 at the time of page insertion.

Further, the process management unit 120 also manages the use of the substitute part 401 of the part data 400.

Specifically, when the job ticket 330 has at least one page including the substitute part 401, the process management unit 120 stops the process before the prepress or RIP (Raster Image Processor) process of printing. After that, when the completed part data 400 corresponding to the substitute part 401 can be acquired, the process management unit 120 replaces it with the link data and proceeds to the RIP processing. After that, when the completed part data 400 can be acquired, the process management unit 120 replaces the link data with the completed part data 400 and proceeds to the RIP process.

In the present embodiment, the process management unit 120 causes the component apparatus 2 to execute each process according to the job ticket 330. This process includes prepressing and printing. For printing, the output destination may be an e-mail output or an electronic document output.

The post-processing unit 130 performs post-processing according to the job ticket 330 for the record or the page that has been performed prepress process or printing process by the process management unit 120. This post-processing includes instructions for collating processing and sorting processing.

The variable document data 300 is a file, a database, or the like, which summarizes variable documents used at the time of variable printing and various data related thereto. The variable document data 300 may be described in, for example, JDF (Job Description Format) and/or JMF (Job Messaging Format).

In this embodiment, the variable document data 300 includes form data 310 and variable data 320. These data may be included in the variable document data 300 as attribute data.

The form data 310 is data including a common form, or the like, which is used in variable printing. The form data 310 basically does not change at the time of printing, although the substitute part 401 may be replaced. The form data 310 may be, for example, data such as PDF (Portable Document Format), PDL (Page Description Language), PPML (Personalized Print Markup Language) that is format of XML (Extensible Markup Language), or the like. Among these, the PDF may be PDF/X, which is a subset of the standard PDF defined by the International Organization for Standardization (ISO15930), a simpler PDF, or the like.

The form data 310 may include one or more part data 400.

The part data 400 may be, for example, a design file that is an image data such as jpg, gif, BMP, PNG, TIFF, PS (Postscript), text and other document data, other type data, or the like. In the present embodiment, the part data 400 is arranged on each page and RIP processed by prepress to form a page.

In the present embodiment, the part data 400 is directly included in the form data 310 as data or stored as link data. That means, in the case of the link data, the data body of the part data 400 may be a separate file. The part data 400 also includes information on whether or not the substitute part 401 is used. As for the part data 400, when the substitute part 401 is used, the link data may be saved.

Further, each part data 400 may include information indicating whether or not proofreading has been completed (hereinafter referred to as "completion information"), and information indicating an estimated time or delay time until the proofreading is completed (hereinafter referred to as "delay information"), or the like.

In addition, the form data 310 may include layout information that defines the layout on the page, and the like. The layout information may include format information such as position (coordinates) and size on the page of the form, font size of variable data 320, left alignment, center alignment, right alignment, and the like. Further, the form data 310 may include data for explaining the definition and items of the variable data 320, or the like.

In the present embodiment, the form data 310 may be different for each page, or it may be a collection of data divided into page units (hereinafter, referred to as "page data"). In this case, different form data 310s may be prepared according to the page order, or different ones may be prepared according to the contents of the variable data 320.

In addition, the form data 310 may include proofreading completion information, delay information, and the like, for each data on this page. Among these, the proofreading completion information may be, for example, information indicating a completion level such as first proofreading completed, re-proofreading completed, third-proofreading completed, fourth-proofreading completed, . . . , color proofreading completed, totally-completed. The delay information may be information, or the like, calculated from the completion level of the proofreading completion information or the time when the completion level changes.

The variable data 320 is data for variable output that changes the print content at the time of printing. The variable data 320 may be, for example, data where printing changes for each copy. Therefore, the variable data 320 may be embedded in the variable document data 300 in a tabular format including a plurality of records, a database format such as XML, or the like.

Alternatively, the variable data 320 may be separately added as a file in a format that is easy to manage as a database. In this case, the variable data 320 may be a database such as a tab-separated or comma-separated file, a spreadsheet application file, another type of database file, a list file, or the like.

In the present embodiment, the variable data 320 may include information indicating whether or not the proofreading has been completed (proofreading completion information), delay information, and the like, for each record. Further, the variable data 320 may also include link data of the part data 400, proofreading completion information, delay information, information on whether or not the substitute part 401 is used, and the like.

The job ticket 330 is job data for causing the server 1 or each component apparatus 2 to execute processing by using the created variable document data 300. The job ticket 330 may be described in JDF (Job Description Format) and/or JMF (Job Messaging Format) as attribute data of processing, for example. For this job ticket 330, for example, prepress, printing, post-processing, and an output destination are specified, and commands, data, and the like, to be transmitted to the output destination are set.

In the present embodiment, the job ticket 330 includes collective data 340 and additional information 350.

The collective data 340 is data obtained by collecting data of completed records or completed pages that can be output from the form data 310 and the variable data 320. In the case of the record priority mode, the set data 340 may mainly include the record data. In addition, in the page priority mode, the collective data 340 may also include page data. Even in this case, the set data 340 may include record data. In addition, the set data 340 may include the link data of the part data 400.

The additional information 350 is data including information on the record order of the records included in the collective data 340 and/or information on the page order of the pages. The record order may be information indicating the position of the record in the variable data, the number of entries, or the like. Further, the page order information may be page number information, page position information in RIP-processed print data, and the like.

Further, the additional information 350 may include proofreading completion information, delay information, or the like, for other records and/or pages. In addition, the additional information 350 may include proofreading completion information, delay information, and the like, for the part data 400 in each record or page. Further, the additional information 350 may include setting information regarding whether or not the record order is specified.

In addition to this, the additional information 350 may include data created by the prepress process, correction contents from the workflow, processing results by offset printing, and the like. Further, the job ticket 330 may also include changed information according to the prepress process, the print process, or the post process.

The workflow setting data 360 is data for setting a workflow for creating an order which is a final product by combining job templates.

In the present embodiment, the workflow setting data 360 includes setting data for suppressing a delay when performing variable printing by the variable document data 300. The setting data includes the setting information of the record priority mode or the page priority mode.

In addition, the workflow setting data 360 may include default data (hereinafter, referred to as "template"). This template contains settings for what job ticket 330 is generated. The template can also be shared. That is, it may be possible to centrally manage changing, or the like, for setting management. This may be done in the same way as using an instance of an object-oriented language "class" globally.

Here, the control unit 10 of the server 1 is made to function as a status management unit 100, a process control unit 110, a process management unit 120, and a post-processing unit 130 by executing the control program stored in the storage unit 19.

Further, each part of the server 1 described above becomes a hardware resource for executing the image forming method of the present disclosure.

In addition, a part or any combination of the above-mentioned functional configurations may be configured in terms of hardware or circuit by IC, programmable logic, FPGA (Field-Programmable Gate Array), or the like.

[Variable Data Process by Industrial Printing System X]

Next, with reference to FIGS. 4 to 7, variable data process by the industrial printing system X according to the embodiment of the present disclosure is described.

In the variable data process of the present embodiment, first, the variable document data 300 is created. Then, from a plurality of records, a job ticket 330 obtained by collectively acquiring the completed records or completed pages of variable data is created. Then, the prepress process or the print process is performed by the created job ticket 330.

In the variable data process of the present embodiment, the control unit 10 of the server 1 mainly executes the control program stored in the storage unit 19 in cooperation with each unit and uses the hardware resources.

Figure 4:
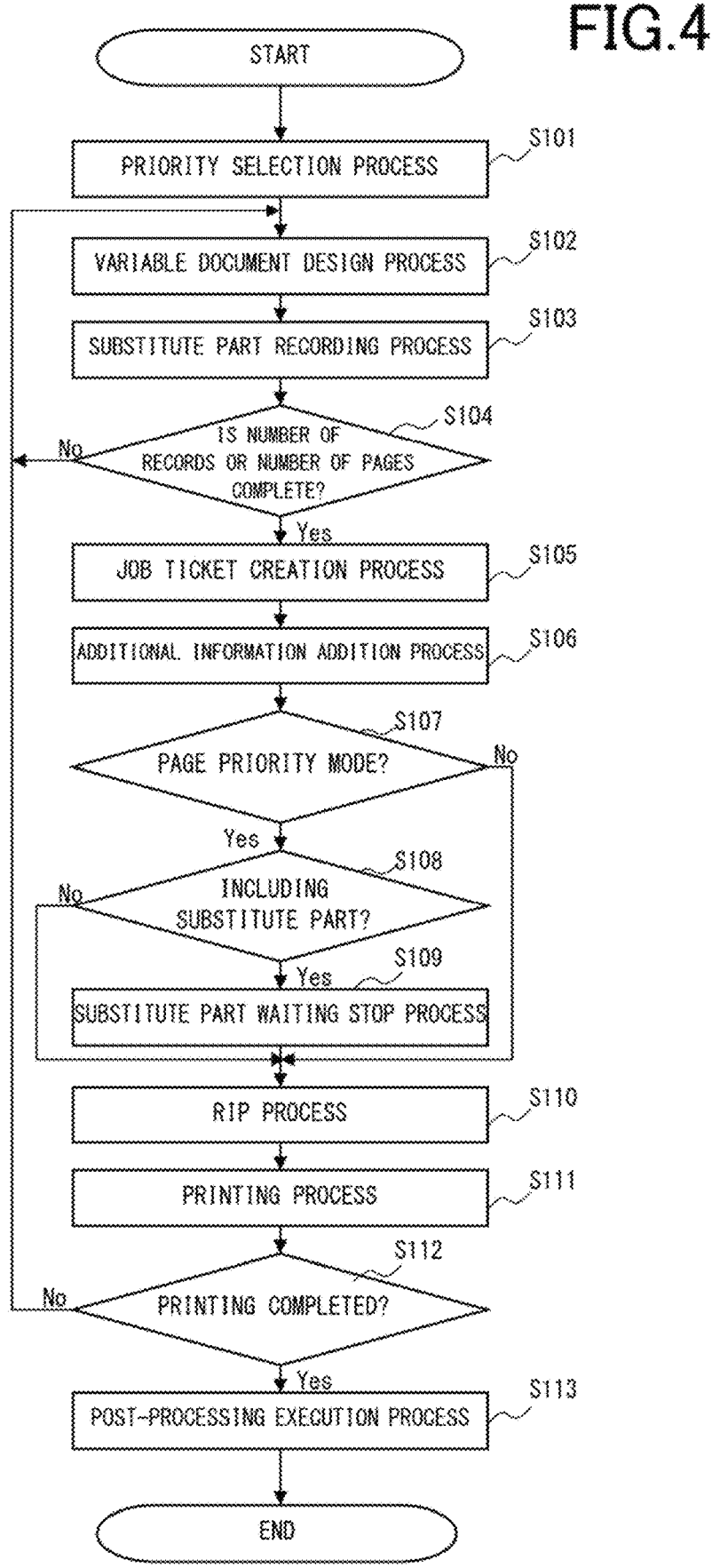
FIG. 4 is a flowchart of variable data process according to the embodiment of the present disclosure.

In the following, with reference to the flowchart of FIG. 4, mainly, the details of the processing by the server 1 is described step by step.

(Step S101)

Firstly, the process control unit 110 performs the priority selection process.

Specifically, the process control unit 110 starts creating a variable document by using a template, or the like, included in the workflow setting data 360 according to an instruction of a user who is an administrator, or the like, and manages the creation of the variable document. Therefore, the process control unit 110 may provide a GUI (Graphical User Interface) or a CUI (Character-based User Interface) by a design application. On this basis, the process control unit 110 stores the created variable document as the variable document data 300 in the storage unit 19.

At the time of creating the variable document data 300, the process control unit 110 acquires an instruction for the record priority mode or the page priority mode by the user by GUI or CUI, and it sets this in the variable document data 300. At this time, the process control unit 110 can also set the number of specific records, the number of specific pages, and the like, for advancing to the next process according to the instruction from the user. For example, the number of specific records can be set to a value of several tens to several thousand, and the number of specific pages can be set to a value of one page to several hundred pages.

In addition, the process control unit 110 can also set a value for the presence or absence of designation to print each record by the order of the record (record order) in the variable data 320 (hereinafter referred to as "record order indication"). When the record order indication is present, as is described later, the collected records are also printed in order after waiting for the acquisition of other records.

Further, the process control unit 110 can also set whether or not the substitute part 401 can be used.

At the time of these settings, the process control unit 110 may use the template so that the settings can be commonly used even when other conditions are specified. In addition, when the user does not instruct the above-mentioned set value, the process control unit 110 can set the default set value by using the template.

Further, the status management unit 100 can also create the template itself by using the GUI or CUI. In addition, the status management unit 100 can also directly specify by JDF and/or JMF, that is, a programmatic description, or the like, by using a so-called "macro" language.

(Step S102)

Next, the status management unit 100 performs variable document design process.

The status management unit 100 creates a variable document in which conditions are set for each record.

The status management unit 100 designs a variable manuscript with the submitted data. Specifically, the status management unit 100 acquires and designs a variable document including each record and each part from the submission terminal. At the time of these designs, the status management unit 100 manages whether or not the proofreading is completed for each record and each page.

In the present embodiment, the status management unit 100 acquires and sets the completion information and the delay information for each part data 400 of the form data 310 of the variable document data 300 and each record of the variable data 320. At this time, the substitute part 401 may also be used.

(Step S103)

Next, the status management unit 100 performs substitute part recording process.

In the present embodiment, when the substitute part 401 is used for the purpose of suppressing delay, or the like, the status management unit 100 records in the form data 310 or the variable data 320 that the substitute part 401 is included in the record or the page. That is, the status management unit 100 can store the record and the page including the substitute part 401.

Further, the status management unit 100 may allow the design to be submitted for other parts of the variable document as a condition that the substitute part 401 is used.

(Step S104)

Next, the process control unit 110 determines whether or not the number of records or the number of pages is complete. The process control unit 110 refers to the form data 310 and the variable data 320 of the variable document data 300, and it confirms whether or not each part data 400 in each record or each page has been completed. In the record priority mode, if there are equal or more than set specific number of the completed records, process control unit 110 determines as Yes. Specifically, for each record in the variable data 320, the process control unit 110 may determine that a record where the contents and the referenced part data 400 have all been completed is a completed record.

Alternatively, in the page priority mode, the process control unit 110 determines Yes if the number of completed pages is equal to or greater than the specific number of pages. At this time, in the page unit, the process control unit 110 may determine that a page where all the referenced part data 400 have been completed (all parts are completed) is a completed page. Here, in the case of setting that the substitute part 401 can be used, even if the substitute part 401 is used, the process control unit 110 may be counted as completed the page if all the other completed part data 400 is completed.

In other cases, the process control unit 110 determines No.

In the case of Yes, the process control unit 110 advances the process to step S105.

In the case of No, the process control unit 110 returns the process to step S102 and continues designing the variable document.

(Step S105)

If the number of records or the number of pages is completed, the process control unit 110 performs a job ticket creation process.

The process control unit 110 collectively acquires the completed records or pages managed by the status management unit 100, and it creates a job ticket 330.

Specifically, the process control unit 110 may generate a job ticket 330 for which prepress, printing, post-processing, and output destination are specified according to the attributes of the record and the page. At this time, the process control unit 110 stores the data of collected record or page in the collective data 340 in the job ticket 330.

Figure 5:
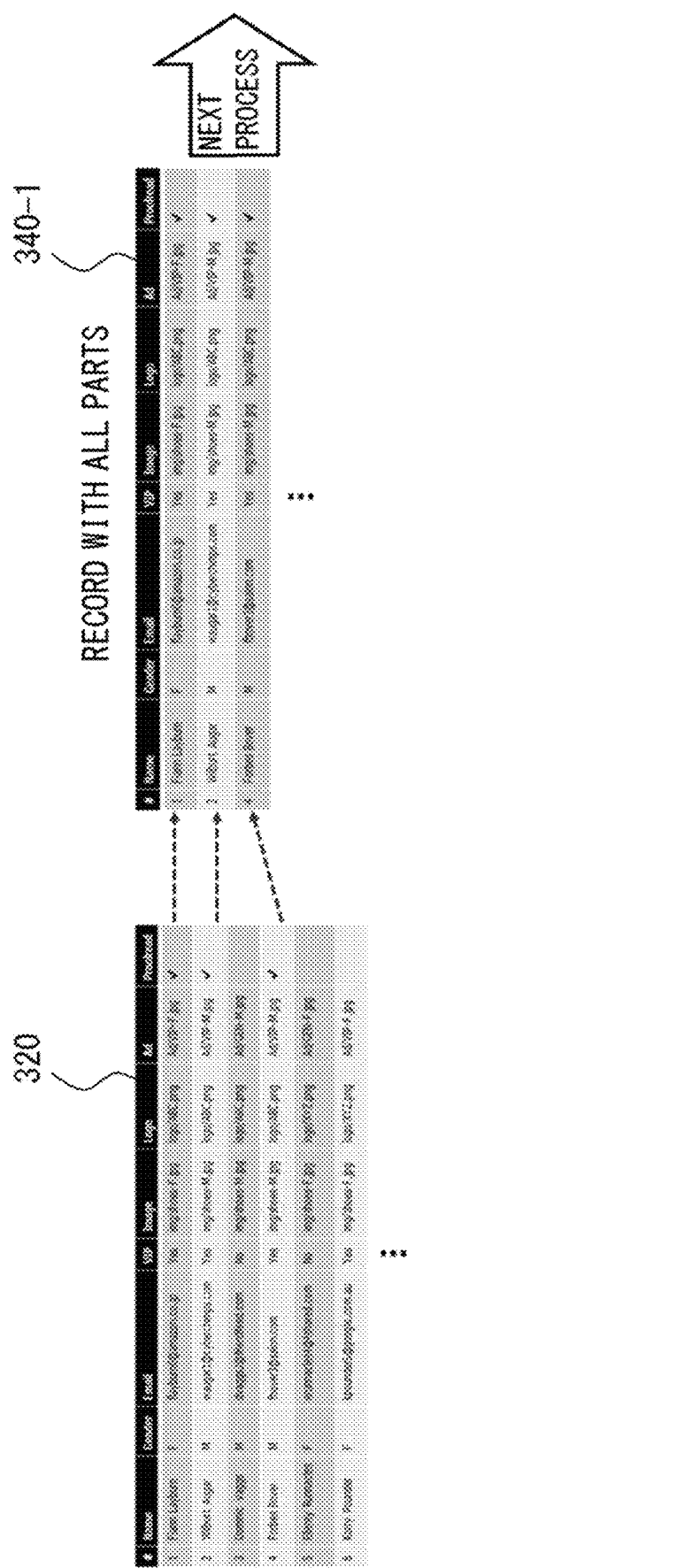
FIG. 5 is a conceptual diagram of the record priority mode in the variable data process as shown in FIG. 4.

As refer to the example of FIG. 5, in the record priority mode, the process control unit 110 collectively acquires a specific number of completed records. In this example, the process control unit 110 stores the acquired record data for the specific number of records as collective data 340-1.

Figure 6:
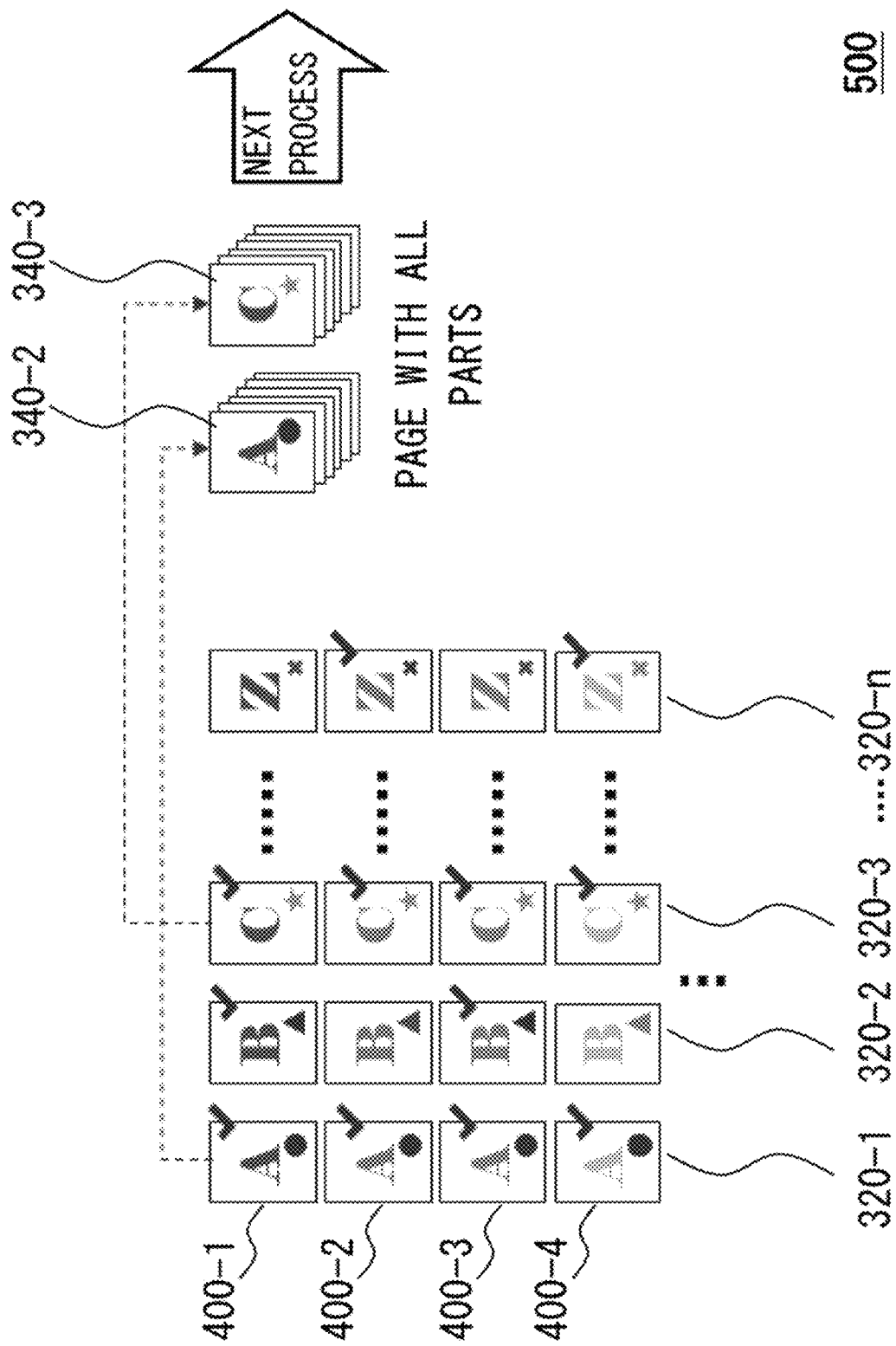
FIG. 6 is a conceptual diagram of the page priority mode in the variable data process as shown in FIG. 4.

As refer to the example of FIG. 6, in the case of the page priority mode, the process control unit 110 collectively acquires the completed pages by a specific number of pages. In this example, the process control unit 110 collects the acquired page data for the specific number of pages and stores them as collective data 340-2 and collective data 340-3.

As refer to the example of FIG. 7, the status management unit 100 may store the substitute part 401 of each page as link data in the job ticket 330. In this example, the status management unit 100 may save the substitute part 401 in the collective data 340-2 as data that refers to external data, that is, link data.

(Step S106)

Next, the process control unit 110 performs additional information addition process.

In the record priority mode, the process control unit 110 records the record order of the completed records in the plurality of records in the additional information 350 of the job ticket 330. That is, assuming data in the case where the record order is meaningful, the record order of the variable data 320 of the variable document data 300 is recorded as additional information 350.

Alternatively, in the page priority mode, the process control unit 110 records the page order of the completed pages in the additional information 350 in the job ticket 330. At this time, the process control unit 110 also records the information whether or not the substitute part 401 is included in the additional information 350. Further, the process control unit 110 may record the information of the unfinished pages in the additional information 350 as a target page to be inserted later.

Further, even in the page priority mode, the process control unit 110 may record the record order information in the additional information 350. As a result, the information in the order of records can be held and used in the job ticket 330, and the records can be prevented from being inserted in a misaligned manner. That is, it is possible to check that the record order is the same between the insert page and the page to be inserted.

As described above, the process control unit 110 records the record order information, the page order information, the insertion page information, the information on whether or not the substitute part 401 is included, and the like, in the additional information 350.

In addition, the process control unit 110 may add matching information according to the post-processing process to the job ticket 330 in any mode. This matching information may be, for example, the part data 400 of a bar code in which the record order is recorded or the page order is recorded for each page. That is, the process control unit 110 may set the job ticket 330 so that the record order and page order are printed as barcodes, or the like, so that they can be used in the post-processing process, and it may add the dedicated part data 400.

The following is an example of the job ticket 330 set in this way.

<insert-page syntax="xxx">
  <value syntax="xxx">
    <insert-page-number syntax="integer"> Insert page number
  </insert-page-number>
    <insert-recode-id syntax="integer">record number
  </insert-count>
  </value>
</insert-sheet>

(Step S107)

Next, the process control unit 110 determines whether or not the page priority mode is set. The process control unit 110 determines Yes if the page priority mode is set in the variable document data 300. The page priority mode is determined to be No in other cases, that is, if the record priority mode is set.

In the case of Yes, the process control unit 110 advances the process to step S108.

In the case of No, the process control unit 110 advances the process to step S110.

(Step S108)

In the page priority mode, the process control unit 110 determines whether or not the substitute part is included. The process control unit 110 determines Yes if the target page to be prepressed or printed on the job ticket 330 includes the substitute part 401. In other cases, the process control unit 110 determines No.

In the case of Yes, the process control unit 110 advances the process to step S109.

In the case of No, the process control unit 110 advances the process to step S110.

(Step S109)

If the page includes the substitute part 401, the process management unit 120 performs a substitute part waiting stop process.

Specifically, the process management unit 120 stops the execution of the processing of the page including the substitute part 401 before the RIP process of the prepress process or the printing process.

Here, the process management unit 120 replaces the substitute part 401 when the completed data is received. Specifically, when the actual part data 400 for the substitute part 401 has been completed and can be acquired from the submission terminal or the design proofreading terminal of the component apparatus 2, the process management unit 120 can acquire this part data 400 in the job ticket 330 via the link data. On this basis, the process management unit 120 determines that the page from which all the actual part data 400 has been acquired becomes a completed page, and it acquires this and proceed with the process.

That is, the process management unit 120 causes the page including the substitute part 401 to be replaced with the corresponding completed part data 400, and then the RIP process is executed.

On the other hand, the process management unit 120 may proceed to the RIP processing of the following prepress process or printing process for the page that does not include the substitute part 401.

(Step S110)

Here, the process management unit 120 performs RIP processing.

The process management unit 120 causes each component apparatus 2 to execute a job by using created job ticket 330.

Therefore, firstly, the process management unit 120 causes the job ticket 330 to be RIP-processed by the prepress apparatus of the component apparatus 2. As a result, print data is generated and transmitted to the printing apparatus. Alternatively, the process management unit 120 may perform RIP process by using the job ticket 330 that has been proofread after printing.

At this time, the process management unit 120 can use the record order information recorded in the job ticket 330 in the prepress process.

(Step S111)

Next, the process management unit 120 performs a printing process.

The process management unit 120 causes the printing apparatus of the component apparatus 2 to perform printing based on the print data generated by the RIP process.

The printed printing paper is conveyed to the post-processing apparatus of the component apparatus 2.

(Step S112)

Next, the post-processing unit 130 determines whether or not printing is completed. The post-processing unit 130 determines Yes if printing is completed for at least the number of pages that can be post-processed. In other cases, the post-processing unit 130 determines No.

In the case of Yes, the post-processing unit 130 advances the processing to step S113.

In the case of No, the post-processing unit 130 returns the processing to step S102 and continues the processing.

(Step S113)

If printing is completed, the post-processing unit 130 performs post-processing execution process. The post-processing unit 130 causes the post-processing apparatus, the shipping management server, and the like, of component apparatus 2 to perform each processing.

The post-processing unit 130 performs post-processing according to the job ticket 330 for the record or the page that has been performed prepress process or printing process by the process management unit 120. Specifically, the post-processing unit 130 causes the post-processing apparatus of the component apparatus 2 to execute the collating process and the rearrangement (reordering) process. At this time, the post-processing unit 130 can also refer to the record order and page order information recorded in the additional information 350 of the job ticket 330 and use them for sorting and page insertion.

In the present embodiment, in the record priority mode, when the additional information 350 of the job ticket 330 has the record order designation, the post-processing unit 130 waits until another record manuscript is printed, and it may perform collation processing according to the designation.

Alternatively, in the case of the page priority mode, the post-processing unit 130 may wait until another page manuscript is printed and perform collating processing according to the insertion page designation.

More specifically, for example, the post-processing unit 130 refers to the record order information and the page order information from the additional information 350 of the job ticket 330. According to this, the post-processing unit 130 causes the collating machine or sorter of the post-processing apparatus to execute the process of rearranging (sorting) in the order of records and the order of pages.

Alternatively, the post-processing unit 130 may perform a process of reading the barcode, or the like, on the printed page with a camera or a scanner and rearranging the printed pages in the order of records and the order of pages.

Further, the post-processing unit 130 may perform sorting under conditions different from the record order and execute collating processing. For example, it is possible to perform a process of "collating" the address in the record and collecting only the specific address.

In addition, the post-processing unit 130 may process the printed matter for which the post-processing has been completed by the shipping management server.

As the above, it completes the variable data process according to the embodiment of the present disclosure.

As configured in this way, the following effects can be obtained.

Printed matter in typical production printing is composed of multiple parts, each of which is designed and manufactured separately.

In general, there are the following process before the printed matter is completed:

(1) Ordering
(2) Specification confirmation
    Product Contents
    Schedule
    Cost Estimation
(3) A) Typesetting, Design, and Proofreading
    Do until the end of proofreading
    B) Complete data submission
(4) Completion (of Proofreading)
(5) Printing
(6) Post-processing (Bookbinding)
(7) Delivery Here, in a typical variable printing, in the process (3), the printing process cannot be proceeded unless all the pages have been completed or the complete data has been submitted. That is, it was not possible to proceed to the next process work such as prepressing and printing until all the parts were prepared.

For this reason, the delivery date may be delayed due to the delay of a specific part.

In particular, in variable printing, since it is possible to design differently for each record, the number of parts is increased and the risk of delay is further increased.

The server 1 of the industrial printing system X according to the present embodiment is a server of an industrial printing system that performs variable printing by production printing, including: a status management unit 100 that manages completion status of a plurality of records or a plurality of pages for the variable printing; a process control unit 110 that collectively acquires a completed record or a completed page managed by the status management unit 100 and create a job ticket 330; a process management unit 120 that performs prepress process or printing process by using the job ticket 330 created by the process control unit 110; and a post-processing unit 130 that performs post-processing according to the job ticket 330 for a record or a page that has been performed prepress process or printing process by the process management unit 120.

With this configuration, in variable printing, the risk of delay can be suppressed by proceeding with processing from record manuscripts and page manuscripts that can be processed without waiting for the completion of all records or pages. That is, the overall delay can be minimized by proceeding to the prepressing or printing work of the next process without waiting for the part data 400 of the record or the page. Therefore, it can be expected that the total cost up to the output of printed matter can be suppressed.

In the server 1 according to the embodiment of the present disclosure, the process control unit 110 can be set to a record priority mode in which the collected records are output first, or a page priority mode in which the collected pages are output first.

With this configuration, in the process control of variable printing, it is possible to select whether to proceed with a record or a page that is considered to cause a production delay, and to manage the printing process reasonably. As a result, the risk of delay can be reduced.

In the server 1 according to the embodiment of the present disclosure, in the case of the record priority mode, the process control unit 110 records the record order of the completed records in the plurality of records in the job ticket 330, and the process management unit 120 uses information in the record order recorded in the job ticket 330 in a prepress process. With this configuration, the information in the order of records that has been advanced can be collected and used in Prepress. As a result, even if the data is meaningful in the order of records, it can be summarized later. Therefore, the labor of rearranging can be reduced.

In the server 1 according to the embodiment of the present disclosure, in the case of the page priority mode, the process control unit 110, records the page order of the completed pages in the job ticket 330, and it causes to use page order information recorded in the job ticket 330 when inserting a page; and the post-processing unit 130 uses the page order information recorded in the job ticket 330 when inserting a page. With this configuration, even if the page order is printed differently in the page priority mode, the post-processing can be rearranged and output in the correct page order. Therefore, the labor of rearranging can be reduced.

In the server 1 according to the embodiment of the present disclosure, the process control unit 110 creates the job ticket 330 for an unfinished part data 400 by using a substitute part 401 and saves the substitute part 401 as link data, and when the job ticket 330 has a page containing the substitute part 401, the process management unit 120 stops the process before prepress process or RIP process of printing, and when completed part data 400 is capable to obtain, replaces the link data, and advances to the RIP process.

With this configuration, in variable printing, it is possible to proceed with processing by using the substitute part 401 without waiting for the completion of all the manuscripts. As a result, the risk of delay on a page-by-page basis can be suppressed.

Other Embodiments

In the above-described embodiment, an example of printing and performing post-processing has been described.

However, the process management unit 120 may output an e-mail and an electronic document instead of printing. Alternatively, the process management unit 120 may send an e-mail to the shipping management server of the component apparatus 2 and manage the e-mail together with the printed output. Further, a job ticket 330 for other processes such as changing the process for inspecting after output may be created.

Further, in the above-described embodiment, an example is described in which a job ticket 330 described in JDF and/or JMF is created and each processing of a variable document is performed. However, it may be configured to perform the same control as the job ticket 330, such as directly controlling each apparatus without creating a JDF and/or a JMF.

By configuring in this way, various configurations can be supported.

Further, in the above-described embodiment, the proper use of the prepress apparatus and the printing apparatus of the component apparatus 2 has not been described.

However, the output destination may be selected from a plurality of apparatuses according to the proof-reading status of the record, the page, or the part data 400 in the page, or the like. That is, it is also possible to select and output a high-speed prepress apparatus or a digital printing apparatus according to the completion information or the delay information, for example, when there is a delay.

Further, when the number of records is small, when printing is performed in a small lot, or the like, it is possible to specify a condition that printing is performed only by a digital printing apparatus without using an offset printing apparatus. Further, the offset printing apparatus and the digital printing apparatus may be used properly depending on the record priority mode and the page priority mode or depending on the completion information and the delay information. Alternatively, a digital printing apparatus may be used for a job ticket 330 in which the number of specific records or a specific number of pages is smaller than a specific threshold value, and an offset printing apparatus may be used when the number of specific records or a specific number of pages is equal to or greater than the specific threshold value.

With this configuration, various conditions can be set to perform variable printing that is actually required in an industrial printing system.

Further, in the above-described embodiment, it is described that the user selects the record priority mode and the page priority mode.

However, it may be automatically set according to the number of records, the attributes and types of the template and the variable document data 300, the number of part data 400 and the substitute part 401, and the like. For example, if there are more records than a certain number, the record priority mode may be used. Alternatively, when the number of part data 400 and substitute part 401 commonly used for the page is large, the number of part data 400 itself is small, and the like, the page priority mode may be used.

With this configuration, the user does not have to set the record priority mode and the page priority mode, and the usability can be improved.

In the above-described embodiment, an example of automatically generating a job ticket 330 by the process management unit 120 has been described.

However, it may be possible for the user to directly create the job ticket 330 according to the setting of the condition by the process control unit 110.

Further, in the above-described embodiment, an example in which the job ticket 330 is attribute data of processing such as JDF and/or JMF is described. However, the job ticket 330 may also be capable of using data in a format such as a macro language or a programming language.

Further, in the above-described embodiment, as the production printing, an example of variable printing on a printed matter of paper, sending an e-mail, and outputting an electronic document is described, but the present embodiment can also be applied to other production printing.

For example, it is also applicable to variable book printing, on-demand printing, and other printing.

Further, for example, it can be used for split printing of large-format posters, sheet printing of exteriors and interiors of aircraft and automobiles, manufacturing of electronic parts such as flat displays and electronic substrates, printing of cultured cells, and the like. In this case, as the component apparatus 2, an industrial inkjet printer, an industrial robot, various reaction apparatuses, a culture apparatus, and the like can also be used.

With this configuration, it can be used for various purposes.

Further, in the above-described embodiment, an example in which various processes are performed on the server 1 has been described.

However, a dedicated terminal for creating variable data 320 may be used, another server for managing workflow may be used, prepress processing may be performed via the administrator terminal 3, or an e-mail transmission server may be used. Further, the configuration may be such that the job ticket 330 is created and controlled by another apparatus.

Further, it is needless to say that the configuration and operation of the above-described embodiment are examples and can be appropriately modified and executed without departing from the aim of the present disclosure.

What is claimed is:

1. An industrial printing system that performs variable printing by production printing, comprising:
   a status management unit configured to manage completion status of a plurality of records or a plurality of pages for the variable printing;
   a process control unit configured to collectively acquire a completed record or a completed page managed by the status management unit and create a job ticket wherein the process control unit performs said acquiring by record or page unit; and
   a process management unit configured to perform a prepress process or a printing process by using the job ticket created by the process control unit, wherein
   the process control unit is:
   capable of collectively acquiring completed records and completed pages; and
   capable of being set to each of a) a record priority mode in which job tickets are created from collected records before job tickets are created from collected pages and b) a page priority mode in which job tickets are created from collected pages before job tickets are created from collected records.

2. The industrial printing system according to claim 1, wherein
   the process control unit, in the case of the record priority mode, records record order of the completed record in the plurality of records in the job ticket, and
   the process management unit uses information in the record order recorded in the job ticket in a prepress process; wherein
   the use comprises summarizing the order of records.

3. The industrial printing system according to claim 2, wherein:
   the process control unit adds barcode component data in the record order or the page order to the job ticket enabling to be used in a post-processing process.

4. The industrial printing system according to claim 3, wherein:
   in the post-processing process, the barcode on the printed page is read with a camera or scanner, and the pages are rearranged in the order of the record and the page.

5. The industrial printing system according to claim 1, wherein
   the process control unit, in the case of the page priority mode, records page order of the completed page in the job ticket, and causes to use page order information recorded in the job ticket when inserting a page; wherein
   even when pages are printed in a different order, the pages are rearranged in post-processing and output in a correct page order.

6. The industrial printing system according to claim 5, wherein
   the process control unit creates the job ticket for an unfinished part by using a substitute part and saves the substitute part as link data, and
   the process management unit, when the job ticket has a page containing the substitute part, stops the process before prepress process or rip process of printing, and when a completed part is capable of being obtained, replaces the link data, and advances to the RIP process; wherein
   the substitute part is a file.

7. The industrial printing system according to claim 1, wherein:
   either the record priority mode or the page priority mode is set according to a variable selected from: number of records, attributes, and types of templates and variable document data, and number of part data and substitute parts.

8. A server of an industrial printing system that performs variable printing by production printing, comprising:
   a status management unit configured to manage completion status of a plurality of records or a plurality of pages for the variable printing;
   a process control unit configured to collectively acquire a completed record or a completed page managed by the status management unit and create a job ticket;
   a process management unit configured to perform a prepress process or a printing process by using the job ticket created by the process control unit; and
   a post-processing unit that performs post-processing according to the job ticket for a record or a page that has been subject to the prepress process or the printing process, wherein
   the process control unit is:
   capable of collectively acquiring completed records and completed pages; and
   capable of being set to each of a) a record priority mode in which job tickets are created from collected records before job tickets are created from collected pages and b) a page priority mode in which job tickets are created from collected pages before job tickets are created from collected records.

9. The server according to claim 8, wherein
the process control unit, in the case of the record priority mode, records record order of the completed record in the plurality of records in the job ticket, and
the process management unit uses information in the record order recorded in the job ticket in a prepress process.

10. The server according to claim 8, wherein
the process control unit, in the page priority mode, records page order of the completed page in the job ticket, and
the post-processing unit uses the page order information recorded in the job ticket when inserting a page.

11. The server according to claim 8, wherein
the process control unit creates the job ticket for an unfinished part by using a substitute part and saves the substitute part as link data, and
the process management unit, when the job ticket has a page containing the substitute part, stops the process before prepress process or RIP process of printing, and when a completed part is capable of being obtained, replaces the link data, and advances to the RIP process.

12. A variable printing method executed by a server of an industrial printing system that performs variable printing by production printing, comprising the steps of:
managing completion status of a plurality of records or a plurality of pages for the variable printing;
acquiring a completed record or a completed page, collectively, by record or page unit and creating a job ticket; and
performing prepress process or printing process by using the job ticket that is created, wherein the server is:
capable of collectively acquiring completed records and completed pages; and
capable of being set to each of a) a record priority mode in which job tickets are created from collected records before job tickets are created from collected pages and b) a page priority mode in which job tickets are created from collected pages before job tickets are created from collected records.

13. The variable printing method according to claim 12, wherein
recording, in the case of the record priority mode, record order of the completed record in the plurality of records in the job ticket, and
using information in the record order recorded in the job ticket in a prepress process.

14. The variable printing method according to claim 12, wherein
recording, in the case of the page priority mode, page order of the completed page in the job ticket, and
causing to use page order information recorded in the job ticket when inserting a page.

15. The variable printing method according to claim 14, wherein
creating the job ticket for an unfinished part by using a substitute part;
saving the substitute part as link data, and
stopping, when the job ticket has a page containing the substitute part, the process before prepress process or RIP process of printing,
replacing, when a completed part is capable of being obtained, the link data, and
advancing to the RIP process.

* * * * *